United States Patent [19]
Collins

[11] 3,911,677
[45] Oct. 14, 1975

[54] INJECTION MOULDING MACHINES

[75] Inventor: George T. Collins, Sutton Coldfield, England

[73] Assignee: British Industrial Plastics Limited, Manchester, England

[22] Filed: June 21, 1974

[21] Appl. No.: 482,029

Related U.S. Application Data

[63] Continuation-in-part of Ser. No. 318,940, Dec. 27, 1972, abandoned.

[30] Foreign Application Priority Data

Dec. 28, 1971 United Kingdom............... 60222/71

[52] U.S. Cl. ................ 60/368; 60/390; 60/486; 60/DIG. 2; 91/35
[51] Int. Cl. .......................................... F15b 9/03
[58] Field of Search ........ 60/DIG. 2, 368, 369, 383, 60/390, 428, 486; 91/35, 37, 39; 425/135, 149

[56] References Cited
UNITED STATES PATENTS

| | | | |
|---|---|---|---|
| 2,571,359 | 10/1951 | Hallenbeck | 60/476 X |
| 2,663,143 | 12/1953 | Joy | 60/371 |
| 2,677,285 | 5/1954 | Volk | 60/DIG. 2 |
| 2,789,541 | 4/1957 | Gaspar et al. | 91/35 |
| 2,807,140 | 9/1957 | Tyler | 60/428 |
| 3,610,782 | 10/1971 | McGuire | 417/326 |

Primary Examiner—Edgar W. Geoghegan
Attorney, Agent, or Firm—Cushman, Darby & Cushman

[57] ABSTRACT

A hydraulically operated injection moulding machine for the moulding of synthetic resin materials including hydraulic pumping means for supplying power to the machine and comprising a variable speed electric motor driving the hydraulic pumping means, the electric motor being arranged and adapted to be operated at speeds and torques each varied directly in accordance with the hydraulic requirements of the machine during an injection moulding cycle. In a preferred embodiment the speeds and torques of the motor are controlled by an electronic variable-speed drive controllable by its response to signals received from the motor, torque and speed reference setting devices and an electronic sequence control system on the machine.

7 Claims, 1 Drawing Figure

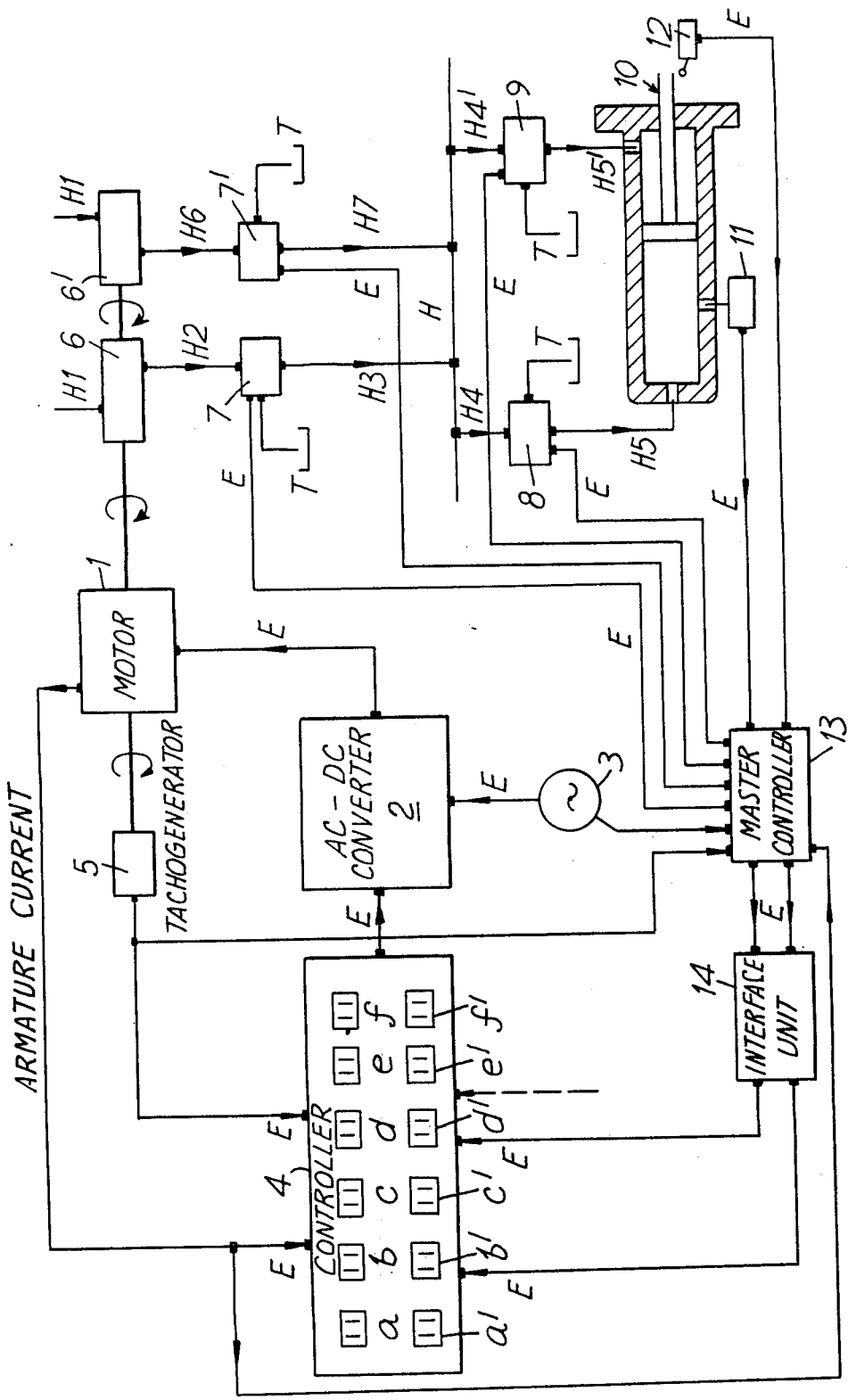

INJECTION MOULDING MACHINES

CROSS REFERENCES TO RELATED APPLICATION

This application is a continuation-in-part of application Ser. No. 318,940, filed Dec. 27, 1972, now abandoned.

Reference is also made to published disclosures having to do with control systems for injection moulding machines, and the disclosures of U.K. Pat. Nos. 1,304,172 and 1,345,142, which are assigned to the assignee of this invention, are hereby incorporated by reference.

BACKGROUND OF THE INVENTION

The present invention relates to hydraulically operated machines for the injection moulding of synthetic resin materials. Such machines are usually powered by electric motors, hydraulic power being controlled by means of throttling valves, together with hydraulic intensifiers, and sometimes by gearboxes between the hydraulic motors and the injection screws. Such arrangements are necessary to give the power variations required by injection moulding cycles.

Inevitably more hydraulic power is generated than is required by the machine for the injection moulding cycle and the excess power has to be absorbed, usually being dissipated as heat.

Before computer or other form of automatic process control can be applied to an injection moulding machine, it is necessary that the hydraulics on the machine be altered so that they can accept forms of control which will permit fine variations of flow and pressure. Heretofore, it has been accepted that there are only two ways by which this fine variation can be achieved, namely by the use of servo valves or by variable delivery or servo pumps. Servo valves are very wasteful in the amount of power that has to be rejected, as mentioned above, and require very clean oil for efficient operation and servo pumps, whilst being more efficient, are more expensive and also require very clean oil. Costly oil filtration systems are, therefore, essential for satisfactory operation of these known systems.

OBJECTS AND SUMMARY OF THE INVENTION

An object of the present invention is to obviate or mitigate the above-mentioned disadvantages of the application of process control to injection moulding machines.

According to the present invention, in an injection moulding machine for the moulding of synthetic resin materials operated by hydraulic power, the power is supplied by at least one hydraulic pump driven by a variable speed electric motor which is arranged and adapted to be operated at speeds and torques which are each varied directly in accordance with the hydraulic requirements of the machine during an injection moulding cycle.

In one preferred arrangement, the electric motor drives two tandem-coupled hydraulic pumps.

With large machines, a plurality of pumps may be used to obtain a wide range of control over, say, the speed of the injection part of the cycle. Since the injection speed is virtually infinitely variable, it can be readily matched to any particular tool to give optimum moulding results, instead of having to alter various valve settings by trial and error as is necessary with conventional injection machines.

The hydraulic circuit of an injection moulding machine embodying the present invention is considerably simplified, and can be reduced to directional control valves for operation, pressure relief valves not being required to control process requirements, being fitted only for safety purposes.

Variable speed DC electric motors are capable of operating for minor periods at up to at least twice their continuously rated power. Great economy of power can be achieved by making use of this feature since maximum power is required for only short periods during each moulding cycle. Accordingly, a lower-powered motor than usual can be used or, conversely, more power can be obtained from a standard motor.

The injection moulding machine of the invention permits accurate control of pressure variation and of the quantity of oil supplied. The control of hydraulic flow and pressure are separated, providing improved moulding technique, for it permits injection at fast rates without exceeding the pressure causing the mould to flash out. Infinitely variable control of screwback is possible without additional hydraulic controls.

Furthermore, the machine may be operated very slowly by operating the variable speed motor at a low speed, thus providing for easier fault detection as an aid to maintenance, and this feature is of general usefulness in mould-cycle analysis.

The machine can be programmed to provide maximum power and torque, for example in the injection stage of the moulding cycle; but during, say, the cooling stage of the cycle the motor can be operated gently to maintain a pre-set torque which provides the hold-on pressure required, with a greatly reduced power consumption.

As the motor and pump or pumps need only be run at full speed for part of the moulding cycle, the noise of the machine's operation is accordingly reduced. Pump life is also increased thereby and furthermore the hydraulic fluid remains cool.

BRIEF DESCRIPTION OF THE DRAWING

The preferred embodiment will be described in more detail with reference to the accompanying drawing which is a diagrammatic representation of part of the control circuitry, electrical leads being designated by the letter E and hydraulic leads by the letter H. T designates a hydraulic reservoir for the injection moulding machine.

DESCRIPTION OF THE PREFERRED EMBODIMENT

In a preferred embodiment of the present invention, hydraulic power is supplied to a 155/50 model BIPEL (Registered Trade Mark) injection machine by two vane-type pumps, one rated at 17 gallons (77 liters) per minute and one rated at 19 gallons (86 liters) per minute, commonly driven by a 25 HP commutating motor supplied with direct current, the amount of current supplied being controlled by an electronic variable-speed drive controlled by its response to signals received from four sources:

1. A tachogenerator coupled to the drive shaft of the motor.
2. A Hall-effect device sensing the armature current of the motor.

3. A number of torque and speed reference setting devices. These are selected by varying resistance or impedence values set by digital switches.

4. Signals from the machine's electronic sequence control system.

The signal from the tachogenerator is directly related to the rate of oil flow in the hydraulic system and the armature current signal is directly related to the motor operating torque which in turn corresponds to the hydraulic pressure generated. The signals from the torque and speed reference setting devices provide a convenient way of programming the machine to operate at prechosen limits of oil pressure and oil flow rate at any given time in its operating cycle, as will be further explained hereafter. The signals from the electronic sequence control system provide the necessary timing information as to what stage the machine is at in the moulding cycle; this, also, is explained further hereinafter.

Referring to the drawing, a variable speed D.C. electric motor 1 (the field of which is held constant) is supplied with power from an AC source 3 by an AC/DC converter 2 incorporating an essentially conventional variable speed drive, for example of the thyristor type, which is arranged to be responsive to instructions from a controller 4 to vary the power supplied to the motor 1. The controller 4 incorporates twelve digital switch units $a$, $a'$, $b$, $b'$, etc., half being designated for pressure and half for speed. Each switch unit enables a steady reference signal corresponding to a particular motor torque (oil pressure) or speed (which corresponds to oil flow rate as described above) to be set up before the machine is actually operated. The controller 4 also contains comparators for comparing the respective preset reference signals with the signals from a tachogenerator 5 coupled to the motor shaft and the signals from a Halleffect device (within the controller 4) sensing the motor armature current. The motor drives two tandem-connected pumps 6 and 6' which feed to a hydraulic main H via line H2, valve 7 and line H3 and via line H6, valve 7' and line H7 respectively. Pump 6' is normally only in use for fast injection, and otherwise is idle. Valves 8 and 9 control the forward and retracting motions of the injection ram shown at 10. Valves 7, 7', 8 and 9 preferably are each electrically operated via a pneumatic pilot, but may be operated by direct hydraulics. In overall control of the moulding machine there is a master controller 13 which may be of any conventional kind capable of providing the necessary degree of control; an example of one suitable system is described in U.K. Pat. Specification No. 1304172. Such a master controller can be programmed to operate the machine entirely automatically throughout the entire cycle, monitoring, for example, pressures by means of transducers such as at 11 and ram positions by limit switches such as at 12, as well as monitoring the speed and torque of the motor 1 and all other parameters of the process, as necessary. As the master controller 13 puts the machine through the sequence of actions making up a moulding cycle, the process control signals which it generates are fed back to the controller 4 through an interface unit 14, the purpose of which unit is to select whichever comparison between the actual motor speed/torque and the preset reference signals is appropriate to that action in the moulding cycle which the machine is effecting at that time. In other words, the interface unit 14 is a switching device which can be regarded as part of the master controller 13. For example, when limit switch 12 is activated by the motion of the ram 10, the master controller 13 recognizes this as a signal indicating that a certain action in the cycle has been completed and that the motor speed and torque signals should now be compared with the reference signals set up by the switches $a$, $a'$, $b$, $b'$, etc. for the next action in the cycle. This set of signals may be the same as for the preceding action in the cycle, or they may be different, depending on the nature of the hydraulic requirements for the actions in question.

Accordingly, throughout the moulding cycle, the motor 1 is operated at speeds and torques which are determined by preset limits appropriate to each action in the cycle, the change from one set of limits to another being effected entirely automatically.

Using the variable speed system described above, it is possible to change quickly both motor speed (flow) and motor torque (pressure) by simply changing digital switches which are calibrated, for example, in 0.1% steps, so that if, for example, the normal maximum pressure is 1800 p.s.i. (12.4 MN/m$^2$) it can be adjusted in steps of 1.8 p.s.i. (12.4 KN/m$^2$). In this example, there are six digital switches for adjusting the rate at which the oil flows and another six for pressure so that for any one of six flow settings, a maximum pressure setting can also be selected.

To illustrate this, a reference signal is set up on the appropriate motor speed digital switch so as to give an oil flow rate which is considered to give, say, a desired injection rate; possibly both pumps will be required to achieve the desired oil flow rate. At the same time, a reference signal corresponding to the maximum motor torque (oil pressure) is set up — obviously this will be selected so as to enable the desired flow rate to be reached. The pressure required must be at least enough to start the moulding material moving through the nozzle and gates of the machine. When the ram is moved forward, the set rate of oil flow will be maintained until the ram has moved to the position where most of the material has been injected and little more oil is required; the pressure in the circuit will now rise to the level set as the maximum required and the motor speed will drop to reduce the oil flow to the value required to pack the mould at this set pressure.

In a manner analogous to that described above, the settings for each other action in the cycle may be set on the corresponding digital switches and the desired limits may be such that the switches identified in the following Table are selected.

TABLE

| Machine Action | Speed Switch | Pressure Switch |
|---|---|---|
| Standby | a | a' |
| Mould Close | b | c' |
| Mould Clamp | b | b' |
| Injection | {d / e} | c' |
| Hold | b | d' |
| Screw-back | c | b' |
| Mould Open | b | c' |
| Charge Accumulation | b | b' |
| Standby | a | a' |

Other combinations may be selected, depending on the actions required, but the above are typical of an actual automatic moulding operation.

Another feature of the invention is the ability of the machine to operate at very slow speeds by the setting of low flow rates; this is of advantage when moulds are being set up and moulding cycles are being analysed.

The following advantages are also possible by use of the invention:

i. costs are reduced since less power is required;

ii. less energy is therefore converted to heat, and less cooling facility is required;

iii. flows and pressures can be adjusted in small steps;

iv. settings can be accurately repeated;

v. noise is reduced, and arises mainly only from metal to metal contact when the machine is opening or closing; and vi. when information has been obtained from transducers regarding the temperature and viscosity of the melt, it can be used to control the speed of injection, the pressure applied to the moulding material before and after mould packing, and the screwback speed for control of the state of the melt.

I claim:

1. An injection moulding machine for the moulding of synthetic resin materials, said machine being operated by hydraulic power and including hydraulic pumping means for supplying the power and a variable speed electric motor for driving the hydraulic pumping means, electronic controller means for controlling the electrical power supply to said variable speed electric motor, said electronic controller having selectively adjustable speed reference means and torque reference means adjustable respectively in accordance with predetermined hydraulic flow and pressure requirements of the machine during an injection moulding cycle, said electronic controller selectively controlling the electrical power supply to said variable speed electric motor in accordance with the settings of said speed reference means and said torque reference means.

2. An injection moulding machine in accordance with claim 1 including a plurality of speed and torque reference means and further including sequencer means responsive to successive portions of a cycle of said injection moulding machine for successively controlling the electrical power supply to said variable speed electric motor in accordance with a predetermined sequence among said plurality of speed and torque reference means.

3. An injection moulding machine for the moulding of synthetic resin materials, said machine being operated by hydraulic power and including hydraulic pumping means for supplying the power and a variable speed electric motor for driving the hydraulic pumping means, electronic controller means for controlling the electrical power supply to said variable speed electric motor, said electronic controller having selectively adjustable speed reference means and torque reference means adjustable respectively in accordance with predetermined hydraulic flow and pressure requirements of the machine during an injection moulding cycle, means for feeding back a signal representative of actual motor speed to said controller, means for feeding back a signal representative of actual motor torque to said controller, said controller including means for performing a comparison between the signals fed back which are representative of actual motor speed and torque to said speed and torque reference means, respectively, said controller adjusting the electric power supply to said electric motor in accordance with said comparison.

4. An injection moulding machine in accordance with claim 3 in which said means for feeding back a signal representative of actual motor speed comprises a tachometer coupled to said motor.

5. An injection moulding machine in accordance with claim 4 in which said means for feeding back a signal representative of actual motor torque comprises means for feeding back a signal representative of motor armature current.

6. An injection moulding machine in accordance with claim 3 including a plurality of speed and torque reference means and further including sequencer means responsive to successive portions of a cycle of said moulding machine for selecting appropriate speed and torque reference means for said comparison.

7. An injection moulding machine in accordance with claim 3 in which said means for feeding back a signal representative of actual motor torque comprises at least one pressure transducer mounted to said injection moulding machine for feeding back a signal representative of the actual pressure developed in said machine.

* * * * *